United States Patent [19]

Furman

[11] Patent Number: 4,989,912
[45] Date of Patent: Feb. 5, 1991

[54] WINDOW RETENTION APPARATUS
[75] Inventor: Herbert Furman, Farmington Hills, Mich.
[73] Assignee: General Motors Corporation, Detroit, Mich.
[21] Appl. No.: 404,486
[22] Filed: Sep. 8, 1989

Related U.S. Application Data

[62] Division of Ser. No. 264,668, Oct. 31, 1988, Pat. No. 4,889,574.

[51] Int. Cl.$^5$ ................................................. B60J 1/00
[52] U.S. Cl. .................................. 296/201; 296/96.21; 52/208
[58] Field of Search .................... 296/201, 96.21, 916; 52/208

[56] References Cited

U.S. PATENT DOCUMENTS

| | | | |
|---|---|---|---|
| 3,274,740 | 9/1966 | Hall | 52/208 |
| 4,261,610 | 4/1981 | Inamoto et al. | 296/201 X |
| 4,738,482 | 4/1988 | Böhm et al. | 296/201 X |
| 4,805,363 | 2/1989 | Gold | 296/201 X |

FOREIGN PATENT DOCUMENTS 3717428 12/1987 Fed. Rep. of Germany ...... 296/201

Primary Examiner—Margaret A. Focarino
Assistant Examiner—Gary C. Hoge
Attorney, Agent, or Firm—Charles E. Leahy

[57] ABSTRACT

According to the present invention, apertures are stamped in the outer flange of the vehicle body and a plurality of depressions are stamped into the inner panel of the vehicle body at a spacing corresponding with the spacing of the apertures of the outer panel. The panels are welded together with the outer panel flange overlying the inner panel flange and the plurality of apertures communicating with the plurality of depressions. The adhesive is applied and flows through the aperture and into the depressions. When the adhesive cures, the bead of adhesive has both an adhesive connection to the outer flange and also a mechanical connection with the inner and outer panels by virtue of having flowed into the depressions.

1 Claim, 1 Drawing Sheet

WINDOW RETENTION APPARATUS

This is a division of application Ser. No. 264,668 filed on Oct. 31, 1988, now U.S. Pat. No.4,889,574.

The invention relates to mounting a window panel in a vehicle body and more particularly provides adhesive attachment in a manner providing both adhesive and mechanical connection of the glass to a flanged vehicle body panel.

It is known to define a vehicle body window opening by welding together flanged edges of inner and outer vehicle body panels. It is also known to mount a vehicle window panel on the flanged vehicle body window opening by installing a bead of curable adhesive along the flange and then inserting the window panel against the adhesive. When the adhesive cures the adhesive bonds to both the window panel and the adjacent flange of the outer panel.

U.S. Pat. No. 4,805,363, issued July 19, 1989 to Peter Gold, and entitled Window Retention Systems for Automotive Vehicles, discloses a plurality of holes provided in the vehicle body flange and a plurality of retaining elements in the form of hollow cylinders which are attached to the inner surface of the flange. The retaining elements have interior portions thereof in communication with the holes in the flange for receiving the curable adhesive. The cross-section of the interior portion is greater than the cross-section of the holes in the flange so that a mechanical interlock is formed between the curable adhesive and the inner surface of the flange.

The present invention provides a new and improved window retention system which obviates the need for the cylinder like retaining elements employed in the Gold patent.

SUMMARY OF THE INVENTION

According to the present invention, apertures are stamped in the outer flange of the vehicle body and a plurality of depressions are stamped into the inner panel of the vehicle body at a spacing corresponding with the spacing of the apertures of the outer panel. The panels are welded together with the outer panel flange overlying the inner panel flange and the plurality of apertures communicating with the plurality of depressions. The adhesive is applied and flows through the aperture and into the depressions. Thus, when the adhesive cures, the bead of adhesive has both an adhesive connection to the outer flange and also a mechanical connection with the inner and outer panels by virtue of having flowed into the depressions.

Accordingly, the object, feature and advantage of the present invention resides in the provision of integrally formed depressions in the inner flange underlying the apertures of the outer flange whereby an adhesive receiving cavity is formed without the necessity for attachment of independent cylinder-like hollow retaining elements.

BRIEF DESCRIPTION OF THE DRAWINGS

These and other features, objects and advantages of the invention will become apparent upon consideration of the drawings in which.

DESCRIPTION OF THE PREFERRED EMBODIMENT

Figure 1:
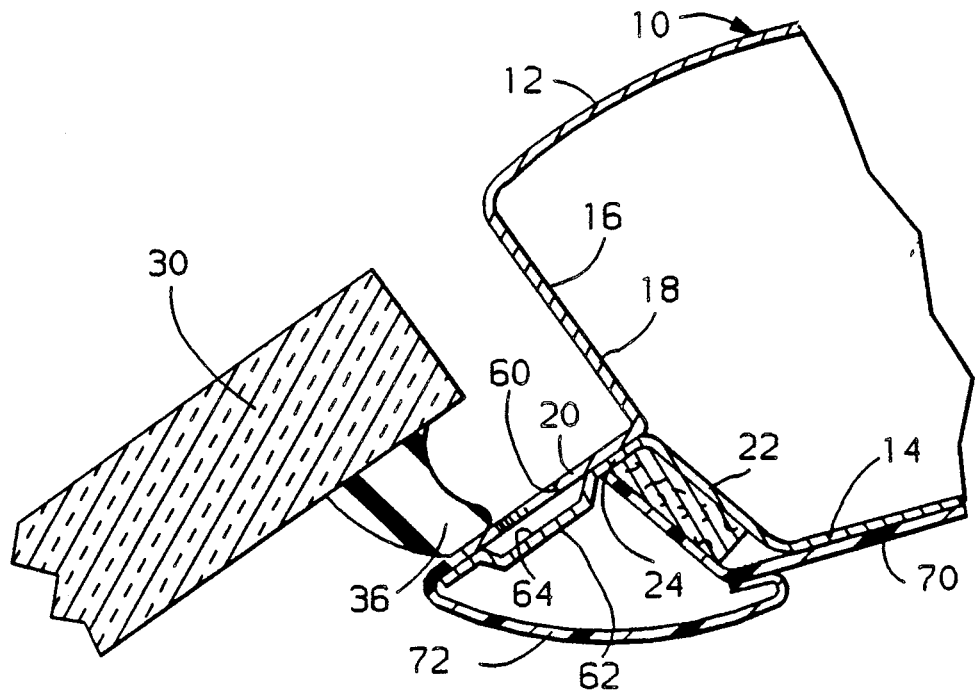
FIG. 1 is a sectional view showing the welded together inner and outer body panel flanges prior to the installation of the window panel, and, FIG. 2 is a sectional view taken through the vehicle body showing the window panel installed according to the method and apparatus of the present invention.

Referring to the drawings, it is seen that the roof structure 10 of the vehicle body includes an outer panel 12 and an inner panel 14. The outer panel 12 includes an inwardly offset flange structure 16 including an inwardly extending flange wall 18 which is perpendicular to the surface of the outer panel 12 and a parallel extending flange wall 20 which extends generally forwardly from the inwardly extending flange wall 18 and is parallel with the outer panel 12. The roof inner panel 14 has similar flange walls 22 and 24. The flange walls 20 and 24 are abutted together in juxtaposed position and are pinch welded together.

The window panel 30 is mounted in the window opening defined by the flange structure 16 of the outer panel 12. The window panel is attached to the vehicle body by a bead of curable adhesive material 34, shown in FIG. 2, which is applied along the perimeter of the window panel 30, or, in the alternative, along the flange structure 16 of the window opening so that it forms a bond between the window panel 30 and the flange structure 16 when the window panel 30 is installed in the window opening. A flexible rubber dam 36 is interposed between the window panel 30 and the parallel extending flange wall 20 of the outer panel 12 to confine the bead of curable adhesive 34.

A reveal molding 50 has a stem portion 52 which is inserted into the bead of curable adhesive 34 and a decorative trim portion 54 which overlies the edge of the window panel 30 and the outer panel 12 to conceal the gap between the window panel 30 and the outer panel 12.

As best seen in FIG. 1, the parallel extending flange wall 20 of the flange structure 16 of outer panel 12 has an aperture 60 provided therein. This aperture 60, and a plurality of other apertures, not shown, but spaced along the flange, are preferably provided in the outer panel 12 prior to the welding of the outer panel 12 to the inner panel 14.

Furthermore, as seen in FIG. 1, the parallel flange wall 24 of the inner panel 14 has a plurality of integrally formed depressions therein, one of which is shown at 62. These depressions 62 are stamped into the inner panel 14 prior to its being welded to the outer panel 12.

When the flange walls 20 and 24 of the inner and outer panels are welded together, the apertures 60 of the outer panel flange wall 20 register with the depressions 62 of the inner panel flange wall 24. Accordingly, as seen in FIG. 2, the curable adhesive flows through the apertures 60 and into the depressions 62.

Figure 2:
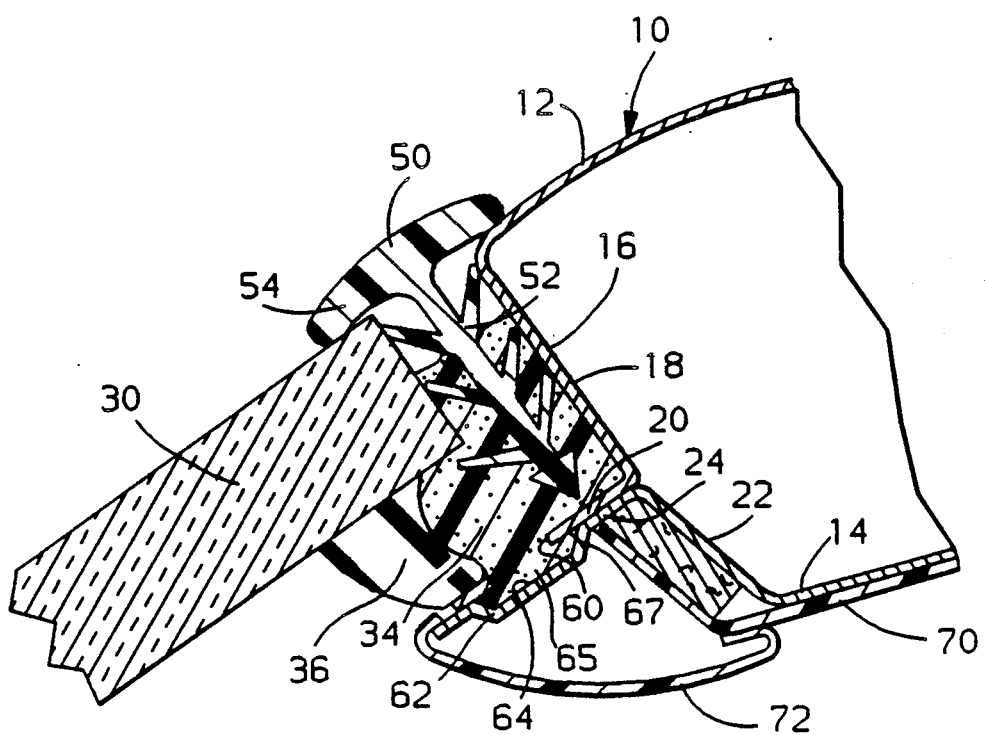

As seen in FIGS. 1 and 2, the depressions 62 are larger in diameter than the apertures 60. Accordingly, a cavity 64 is formed beneath the outer panel 12 so that adhesive which flows through the apertures 60 is captured in the cavity 64. Thus, when the adhesive cures, a knob 65 of adhesive is formed in the cavity 64 and behind the underside 67 of the outer panel flange wall 20. The entrapment of this knob 65 of adhesive in the cavity 64 formed between the depressions 62 and the outer panel 20 provides a mechanical attachment of the bead of adhesive 34 to the vehicle body which supplements the normal adhesive bond between the adhesive and the body.

It will be appreciated that the stamping of the apertures in the outer panel flange, and the formation of the depressions in the inner panel flange, may be performed in the stamping dies which stamp the inner and outer panels, or may be provided in the trim die which trims excess metal from these panels. Furthermore, it will be appreciated that the apertures of the outer panel flange need not align exactly with the depressions of the inner panel. Should the apertures become mismatched somewhat with respect to the depressions, the adhesive will nonetheless flow through the apertures and into the depression even though the depression may not be precisely centered with respect to the aperture. Furthermore, it will be understood that the adhesive need not completely fill the depression in order to provide an effective mechanical contribution to the retention of the window panel. The apertures and depressions may be circular, oval, or other shape, as desired.

The headlining 70 and a garnish molding 72 conceal the flange wall 24 and depressions 62 from view.

Thus it is seen that the invention provides a new and improved window retention apparatus and method for providing a mechanical as well as an adhesive retention between a bead of adhesive and a vehicle body.

The embodiments of the invention in which an exclusive property or privilege is claimed are defined as follows:

1. In a motor vehicle body having inner and outer panels with juxtaposed flanges welded together to define a window opening, and a window panel mounted in the window opening by a bead of curable adhesive applied to the flange of the outer panel and having the window panel applied against the adhesive and adhesively retained to the flange, the improvement comprising:

the outer flange having an aperture and the inner flange having a depression formed therein, said hole and said depression being aligned with one another so that the adhesive enters the aperture and the depression, and the depression having a larger dimension than the dimension of the hole so that the adhesive forms a mechanical connection as well as an adhesive connection with the vehicle body.

* * * * *